US009116992B2

(12) United States Patent
Pike et al.

(10) Patent No.: US 9,116,992 B2
(45) Date of Patent: *Aug. 25, 2015

(54) PROVIDING TIME SERIES INFORMATION WITH SEARCH RESULTS

(75) Inventors: Geoffrey Roeder Pike, San Francisco, CA (US); Luigi Semenzato, Oakland, CA (US)

(73) Assignee: Google Inc., Mountain View, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 13/617,560

(22) Filed: Sep. 14, 2012

(65) Prior Publication Data

US 2015/0169752 A1    Jun. 18, 2015

Related U.S. Application Data

(63) Continuation of application No. 12/835,062, filed on Jul. 13, 2010, now Pat. No. 8,326,836.

(51) Int. Cl.
*G06F 7/02* (2006.01)
*G06F 17/30* (2006.01)

(52) U.S. Cl.
CPC .... *G06F 17/30864* (2013.01); *G06F 17/30424* (2013.01); *G06F 17/30551* (2013.01)

(58) Field of Classification Search
CPC ............... G06F 17/30424; G06F 17/30551; G06F 17/90997; G06F 17/30
See application file for complete search history.

(56) References Cited

U.S. PATENT DOCUMENTS

| | | | |
|---|---|---|---|
| 7,750,908 B2 | 7/2010 | Kincaid et al. | |
| 8,112,425 B2 * | 2/2012 | Baum et al. | 707/746 |
| 8,442,863 B2 * | 5/2013 | Chandramouli et al. | 705/14.43 |
| 2006/0100969 A1 | 5/2006 | Wang et al. | |
| 2007/0244854 A1 | 10/2007 | Nevill et al. | |
| 2009/0204551 A1 * | 8/2009 | Wang et al. | 705/400 |
| 2013/0103657 A1 * | 4/2013 | Ikawa et al. | 707/693 |

OTHER PUBLICATIONS http://www.google.com/; "chile military spending"; Apr. 13, 2010; 2 pages.
http://www.google.com/; "what was ted williams batting average"; Apr. 13, 2010; 2 pages.

* cited by examiner

*Primary Examiner* — Bruce Moser
(74) *Attorney, Agent, or Firm* — Fish & Richardson P.C.

(57) ABSTRACT

Methods, systems, and apparatus, including computer programs encoded on a computer storage medium, for providing time series information with search results. In one aspect, a method includes determining that a first query is indicative of a request for time series information; generating a cost estimate that quantifies one or more costs of including the time series information with one or more search results, each search result including a resource locator that references a corresponding resource determined to be responsive to the query; generating a benefit estimate; determining to generate the time series information when the benefit estimate is greater than the cost estimate and generating the time series information in response to the determination, wherein generating the time series information includes collecting responsive time series information from one or more resources; and determining to not generate the time series information when the cost estimate is greater than the benefit estimate.

18 Claims, 6 Drawing Sheets

US 9,116,992 B2

PROVIDING TIME SERIES INFORMATION WITH SEARCH RESULTS

RELATED APPLICATIONS

This U.S. patent application is a continuation of and claims priority under 35 U.S.C. §120 from U.S. patent application Ser. No. 12/835,062, filed on Jul. 13, 2010. The disclosure of the prior application is considered part of the disclosure of this application and is hereby incorporated herein by reference in its entirety.

BACKGROUND

This specification relates to providing time series information with search results.

The Internet provides access to a wide variety of resources, for example, video files, image files, audio files, or Web pages including content for particular subjects, book articles, or news articles. A search system can select one or more resources in response to receiving a search query. A search query is data that a user submits to a search engine to satisfy the user's informational needs. The search system selects and scores resources based on their relevance to the search query and on their importance relative to other resources to provide search results that link to the selected resources. The search results are typically ordered according to the scores, and provided in a search results page.

Often a user's need for information can be satisfied by providing time series information with search results for certain queries. As used herein, time series information is a sequence of data points associated with time values. The time intervals may be equal intervals (e.g., yearly) or unequal intervals (e.g., logarithmic intervals, intervals measuring fixed changes in a data value, and so on). However, such queries need to be identified as indicative of a request for time series information (e.g., that the user would be well served by having time series information with the search results).

Additionally, such time series information is usually not available in any single resource, but can be collected from a number of related documents. Extracting and organizing this information can consume many processing resources, or can require time-intensive manual labor. Finally, even if a user's need for information can be satisfied by providing time series information with search results, there may be little benefit for providing time series information for certain queries when balanced against the cost of generating the time series information.

SUMMARY

In general, one innovative aspect of the subject matter described in this specification can be embodied in methods that include the actions of determining that a first query of one or more terms is indicative of a request for time series information; generating a cost estimate that quantifies one or more costs of including the time series information with one or more search results, each search result including a resource locator that references a corresponding resource determined to be responsive to the query; generating a benefit estimate that quantifies one or more benefits of including the time series information with the one or more search results; determining to generate the time series information when the benefit estimate is greater than the cost estimate and generating the time series information in response to the determination, wherein generating the time series information includes collecting responsive time series information from one or more resources; and determining to not generate the time series information when the cost estimate is greater than the benefit estimate. Other embodiments of this aspect include corresponding systems, apparatus, and computer programs, configured to perform the actions of the methods, encoded on computer storage devices.

These and other embodiments can optionally include one or more of the following features. Determining that the first query is indicative of a request for time series information includes performing one or more of: semantically analyzing the query for terms that are indicative of a request for the time series information; determining that the query specifies one or more date ranges; identifying, from click log data, user click data responsive to providing time series information to users; and determining whether resources referenced by the search results include time series information.

Generating a cost estimate includes performing one or more of: determining whether time series information is cached and calculating the cost estimate based in part on the determination of whether time series information is cached; determining a system load and calculating the cost estimate based in part on the determination of the system load; determining an estimated amount of processing time for collecting responsive time series information and calculating the cost estimate based in part on the determination of the estimated amount of processing time; determining an estimated latency for collecting responsive time series information and calculating the cost estimate based in part on the determination of the estimated latency; and determining an estimated network resource load for providing time series information and calculating the cost estimate based in part on the determination of the estimated network resource load.

Generating a benefit estimate includes performing one or more of: determining expected user behavior based on one or more characteristics of a user that provided the first query and calculating the benefit estimate based in part on the determination of expected user behavior; determining a level of certainty for the time series information and calculating the benefit estimate based in part on the level of certainty; and analyzing click log data for search results in which time series information was provided with the search results and calculating the benefit estimate based in part on the click log data.

Collecting responsive time series information includes extracting time series information from the plurality of the resources referenced by the search results and aggregating the time series information. The actions can further include receiving a second query from a client device; determining that the second query matches the first query; determining that time series information was generated for the first query and in response providing instructions to the client device that, when executed by the client device, cause the time series information to be displayed on the client device. The actions can further include determining whether to provide the time series information in a graph format or in a table format, and wherein the instructions include instructions to display the time series information in the determined format.

Determining to generate the time series information further comprises: providing instructions to a client device that, when executed by the client device, cause a prompt to be displayed asking whether time series information is desired; and receiving an indication from the client device that time series information is desired. The actions can further include determining a level of certainty for one or more points of the time series information; and providing instructions to a client device that, when executed by the client device, cause the time series information to be displayed with an indication of the level of certainty for the one or more points.

The actions can further include accessing a cache of indexed resources; for each indexed resource, determining whether the indexed resource includes any time series information; and for at least one indexed resource including time series information, extracting the time series information and associating it with the indexed resource; wherein collecting responsive time series information from one or more resources includes collecting the extracted time series information associated with the at least one indexed resource.

The actions can further include collecting popular time series information for popular queries, including: determining a plurality of popular queries in a query log that are indicative of requests for time series information, each popular query having a minimum number of entries in the query log for a predefined time period; and for each popular query, collecting time series information and associating the time series information with the popular query.

Particular embodiments of the subject matter described in this specification can be implemented so as to realize one or more of the following advantages. A search system provides time series information to users who might find the time series information helpful instead of providing time series information to every user without considering whether the time series information is likely to be helpful. Resources (e.g., time, money, computing resources) can be conserved by providing time series information when a cost-benefit analysis indicates that certain benefits associated with providing time series information outweigh certain costs. Time series information can be gathered from various resources and provided in various formats, and a format that is determined to be most helpful to a user can be selected for providing the time series information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
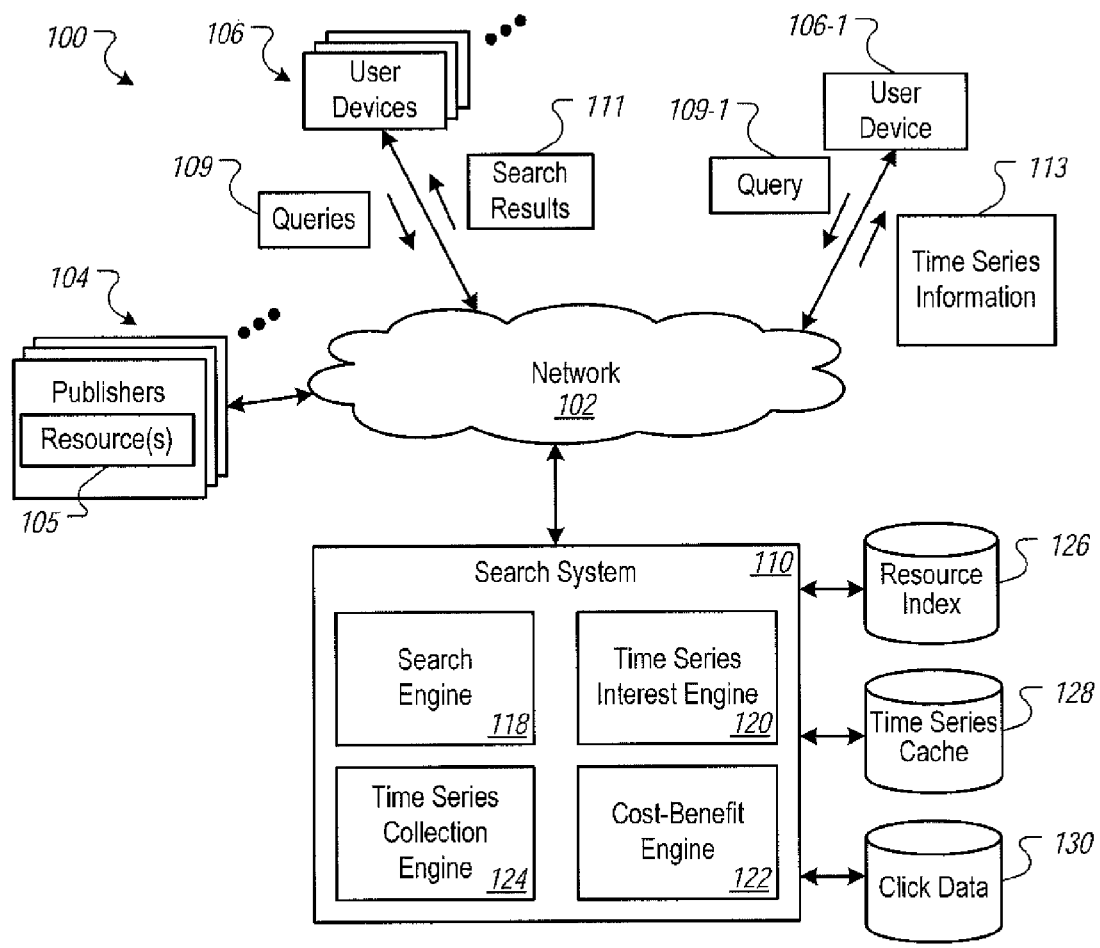
FIG. 1 is a block diagram of an environment in which a search system provides time series information with search results.

FIG. 1 is a block diagram of an environment 100 in which a search system 110 provides time series information with search results. A computer network 102, such as a local area network (LAN), a wide area network (WAN), the Internet, or a combination thereof, connects publishers 104, user devices 106, and the search system 110. The online environment 100 can include many publishers 104 and user devices 106.

A publisher 104 is any web site that hosts and provides electronic access to a resource by use of the network 102. A web site can be a collection of one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 104 over the network 102 and that is addressed by a resource address. Resources include HTML pages, word processing documents, portable document format (PDF) documents, images, video, and feed sources, to name just a few. The resources may include content, such as words, phrases, pictures, and so on, and may include embedded information, such as meta (or metadata) information and hyperlinks and/or embedded instructions (such as JavaScript scripts).

Each resource has an addressable storage location that can be uniquely identified. The addressable location is addressed by a resource locator, such as a universal resource locator (URL).

A user device 106 is an electronic device that is under control of a user and is capable of requesting and receiving resources over the network 102. Example user devices 106 include personal computers, laptop computers, mobile communication devices, and other devices that can send and receive data over the network 102. A user device 106 typically includes a user application, such as a web browser, to facilitate the sending and receiving of data over the network 102.

The search system 110 includes a search engine 118 for searching resources. As there are many thousands of publishers, there are millions of resources available over the network 102. To facilitate searching of these resources, the search engine 118 identifies the resources by crawling the publishers 104 and indexing the resources provided by the publishers 104. The indexed and, optionally, cached copies of the resources are stored in a resource index 126. In general, the resource index 126 can include various types of indexes for resources, including keyword-based indexes, location-based indexes, and other indexes.

The user devices 106 submit search queries 109 to the search engine 118. In response, the search engine 118 uses the resource index 126 to identify resources that are relevant to the queries. The search engine 118 identifies resources, generates search results 111 that identify the resources, and returns the search results 111 to the user devices 106. A search result 111 identifies a resource that is responsive to the query and includes a resource locator for the resource. An example search result 111 can include a web page title, a snippet (or portion) of text extracted from the web page, and the URL of the web page.

The search results are ranked based on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on initial relevance scores that are a combination of the IR scores and page quality scores. The search results 111 are ordered according to these initial relevance scores and provided to the client device 106 according to the order.

The user devices 106 receive the search results pages and render the pages for presentation to users, such as in the users' browsers. In response to a user selecting a search result at a user device 106, the resource is provided to the requesting user device 106.

In some implementations, the search system 110 provides time series information 113 in addition to search results 111 that are provided in response to a query. Time series information 113 is a sequence of data points associated with successive times spaced at uniform or irregular time intervals. For example, time series information 113 can include a sequence of stock quotes for a given period of time, a sequence of temperature readings for a certain city over a period of time, a sequence of rainfall totals for each rainfall event over a period of time, and so on. Typically, the time series information 113 is determined to be responsive (e.g., relevant, related, or the like) to a query before it is provided in response to the query.

In some implementations, the search system 110 includes a time series interest engine 120, a cost-benefit engine 122, and a time series collection engine 124. The engines are implemented in a data processing apparatus (e.g., one or more computer servers) and cause the data processing apparatus to perform the operations and functions described below. Other software architectures that include more or fewer engines or modules can also be used instead of the example architecture shown. Using the engines 120-124, the search system 110 can include time series information 113 with search results 111 in response to a query.

The time series interest engine 120 determines whether a query is indicative of a request for time series information. When a query is indicative of a request from time series information, the cost-benefit engine 122 generates a cost estimate and a benefit estimate for including time series information with search results. The cost-benefit engine 122 determines whether the benefit estimate is greater than the cost estimate. In some implementations, the cost-benefit engine 122 uses click log data 130 for determining a cost estimate and a benefit estimate. The time series collection engine 124 collects time series information from resources (e.g., publishers' resources 105 or resources in the resource index 126). In some implementations, the time series collection engine 124 stores collected time series information in a time series cache 128.

As will be described below, there are different ways by which the search system 110 can provide time series information. FIGS. 2A-2D describe some examples.

Figure 2A:
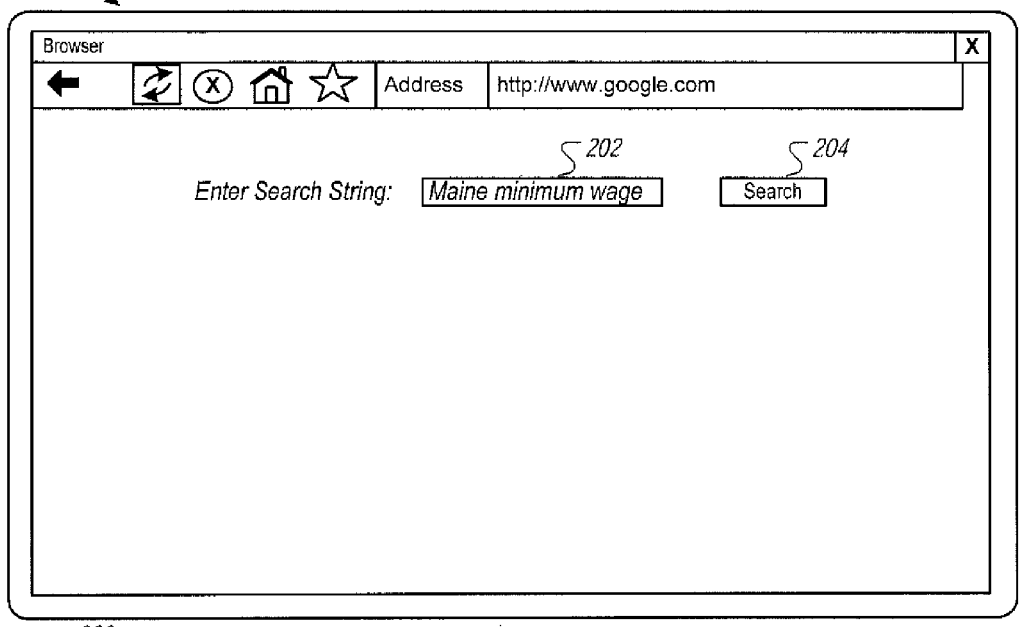
FIGS. 2A-2D illustrate a search user interface as displayed in an example graphical user interface (GUI) as presented in a web browser or other software application.

FIG. 2A illustrates a search user interface as displayed in an example graphical user interface (GUI) 200 as presented in a web browser or other software application. The GUI 200 includes a text entry field 202 which accepts queries from users when a search button 204 is selected, for instance. Queries can be text (e.g., "Maine minimum wage") or speech that specifies general or specific topics or other information. A submitted query is transmitted to a search engine that identifies resources that are responsive to the query in an index of resources of the world wide web or other corpus and then transmits search results 212a-b to the web browser for presentation in region 212 of the GUI 200 (FIG. 2B).

Figure 2B:
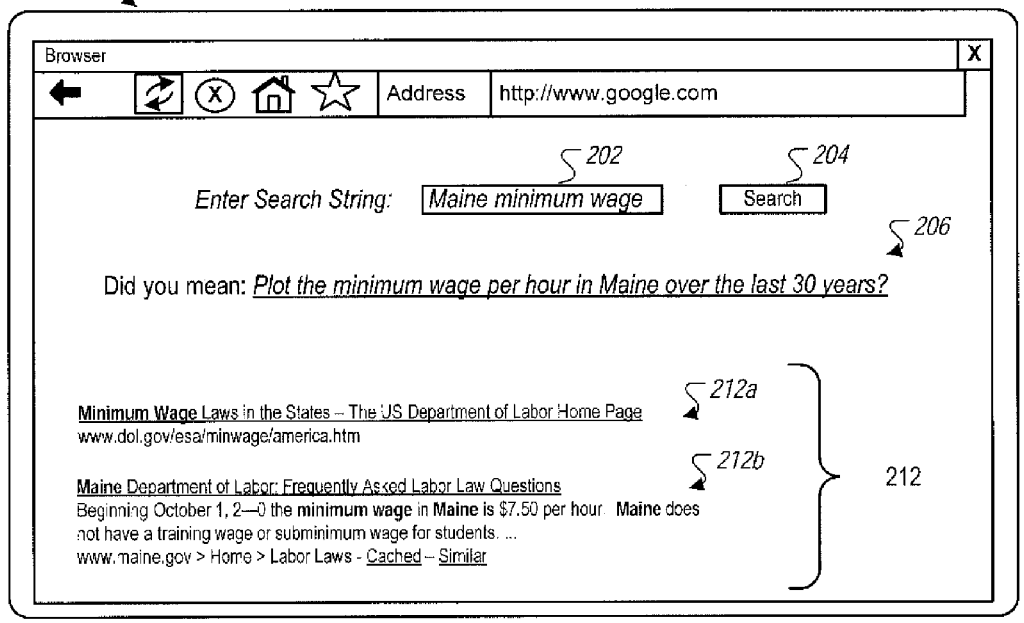

FIG. 2B illustrates a search user interface as displayed in an example GUI 200 as presented in a web browser or other software application. A prompt 206 is displayed in response to the search query "Maine minimum wage" indicating that time series information is available (e.g., by prompting "Plot the minimum wage per hour in Maine over the last 30 years?" or requesting if the user meant "Plot the minimum wage per hour in Maine over the last 30 years?"). The prompt can display various indications that time series information is available.

Figure 2C:
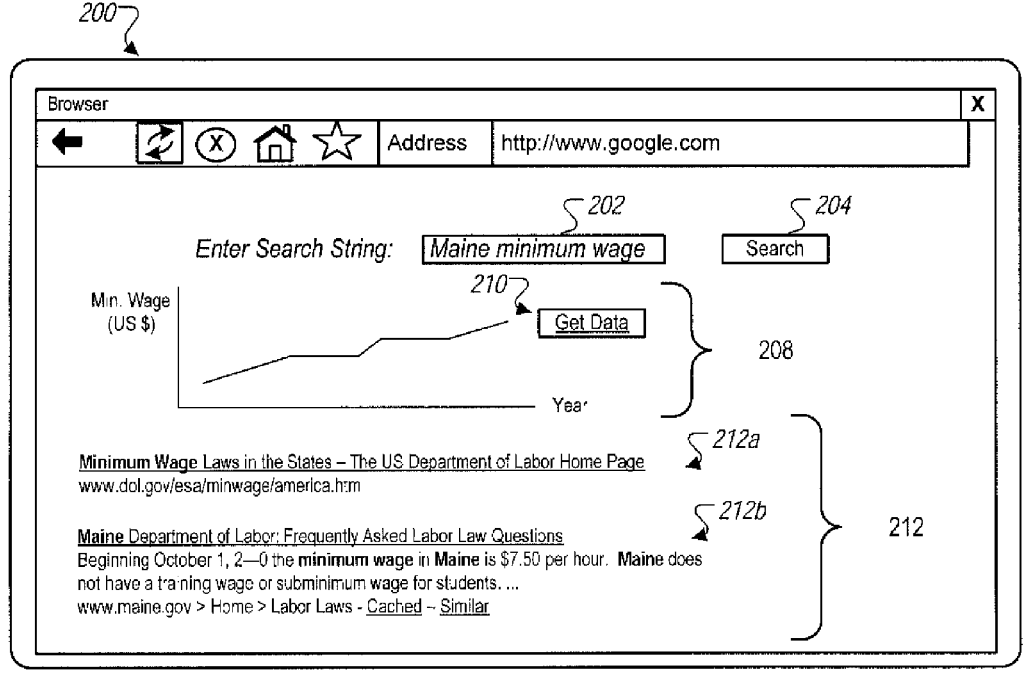
Figure 2D:
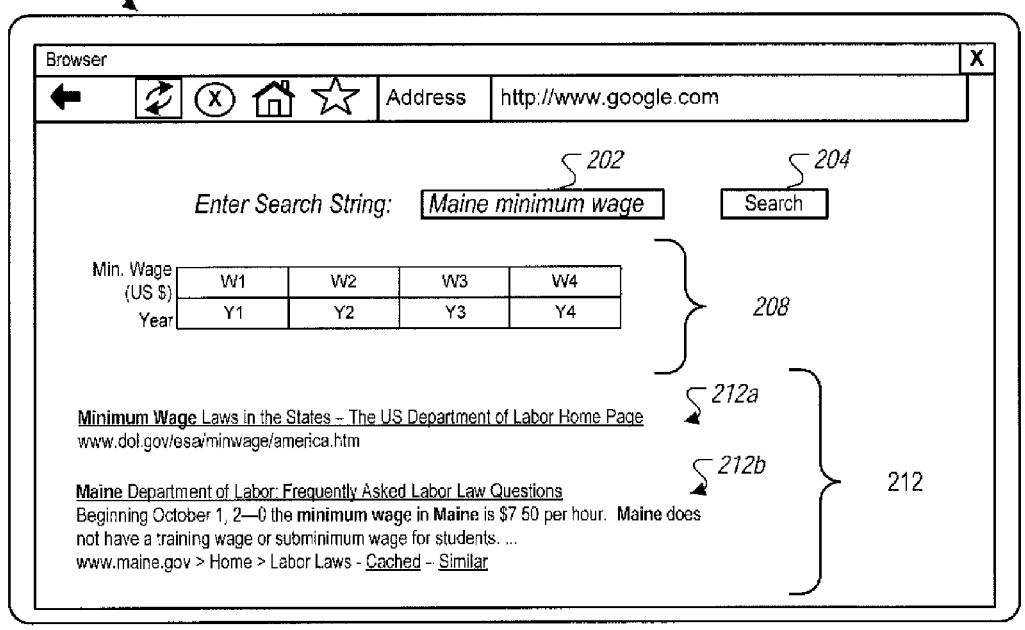

A user can click on the prompt 206 to send data indicating that time series information is desired. The search engine can then provide the time series information (FIG. 2C and FIG. 2D). Displaying the prompt is optional. In some implementations, the search engine provides a prompt only under certain conditions such as when the difference between a cost estimate and a benefit estimate is in a certain range. For example, if the cost estimate exceeds the benefit estimate by a first threshold, then the prompt is not provided, nor is any time series information. If, however, the cost estimate does not exceed the benefit estimate by the first threshold, and the benefit estimate does not exceed the cost estimate by a similar threshold, then the prompt is provided. Finally, if the benefit estimate exceeds the cost estimate by the similar threshold, then the time series information is provided with the search results without user input.

FIG. 2C illustrates a search user interface as displayed in an example GUI 200 as presented in a web browser or other software application. Time series information is displayed as a graph in region 208 of the GUI 200. The graph shows data points for the minimum wage in Maine in United States dollars plotted against years (the data points are merely illustrative and are not accurate). An optional "Get Data" button 210 is displayed. A user can click the button 210 to display or download a file including the data displayed in the graph (e.g., as a text or spreadsheet file).

In some implementations, the "Get Data" button 210 can be used to see one or more sources for the time series information. For example, pressing the button 210 can cause a new web page to be loaded showing a link to each resource used in generating the time series. In some implementations, the resources used in generating the time series are shown like search results, e.g., with titles, links, and snippets. In some implementations, a snippet from the resource used to generate a particular point in the time series information is displayed (e.g., in a pop-up window or the like) when the mouse hovers over that point on the displayed graph.

FIG. 2D illustrates a search user interface as displayed in an example GUI 200 as presented in a web browser or other software application. Time series information is displayed as a table in region 208 of the GUI 200. The table shows data points for the minimum wage in Maine in United States (W1-W4) and years corresponding to the data points (Y1-Y4). The table can be provided, for example, in response to selecting the "Get Data" button 210 of FIG. 2C. Alternatively, the table can be provided based one or more user preferences that are either explicitly or implicitly defined.

Figure 3:
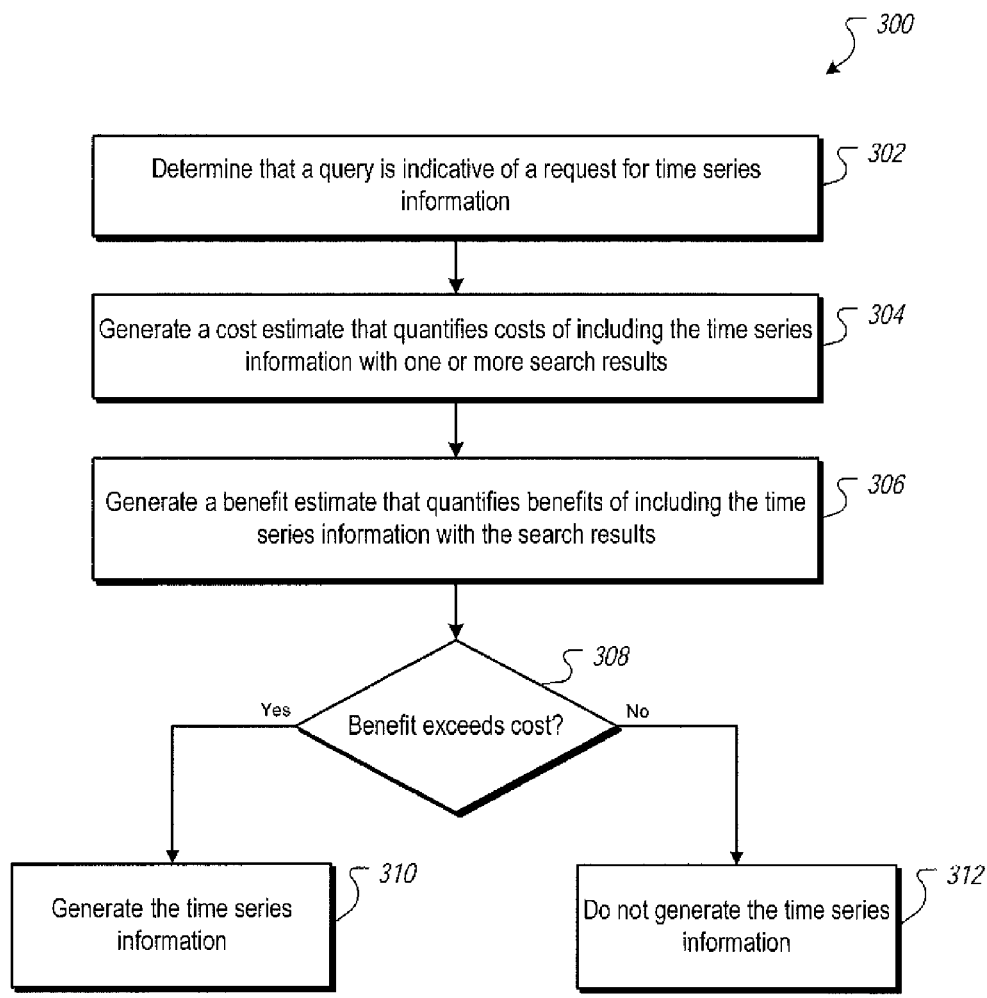
FIG. 3 is a flow diagram of an example process for generating time series information.

FIG. 3 is a flow diagram of an example process 300 for generating time series information. In some implementations, the process 300 is performed by a data processing apparatus (e.g., search system 110).

A query is determined to be indicative of a request for time series information (302). Determining whether a query is indicative of a request for time series information can be performed by a time series interest engine (e.g., time series interest engine 120).

The query can be a submitted query from a user, a query from a query log, or from another source. In some implementations, the processing of time series information is done in advance of query time, e.g., by processing a query log (e.g., a log including queries submitted to a search system 110 by users) and determining for which queries time series information should be generated. For example, the processing of time series information can be done in advance of query time for popular queries. Popular queries can be identified from a query log. A popular query has a minimum number of entries in the query log for a predefined time period.

In some implementations, determining whether a query is indicative of a request for time series information includes semantically analyzing the query for terms that are indicative of a request for the time series information. Semantically analyzing the query includes searching for terms associated with an interest in a time series, for example, "historical," "over time," "changed," and the like. In some implementations, terms associated with an interest in a time series are determined by analyzing a query log for terms that are frequently combined with date ranges or other words that explicitly indicate an interest in a time series. For example, if the term "world population" is frequently searched for with dates, e.g., "world population 2005," "world population 2004," etc., then that term can be determined to be associated with an interest in a time series.

In some implementations, determining whether a query is indicative of a request for time series information includes determining that the query specifies one or more date ranges, whether explicitly or implicitly identified. For example, a query that includes the terms "from 1500-1600" or "during the Reagan administration" is likely to indicate a request for time series information.

In some implementations, determining whether a query is indicative of a request for time series information includes identifying from click log data (e.g., click data 130) user click data responsive to providing time series information to users. Although a query may otherwise indicate time series information (e.g., "world population 2005"), if time series information is provided but rarely selected, the search system can interpret this data as indicating that the query is not well served by time series information. Thus, in some implementations where the time series information has previously been provided to users, the user click data can be analyzed to determine whether the users clicked on the displayed time series information (e.g., to change its display properties or download the underlying data), responded to a prompt for the time series information, how long the user devices presented the time series information (which can be an indication of how long a user may have viewed the time series information), and so on.

In some implementations, determining whether a query is indicative of a request for time series information includes determining whether resources referenced by search results for the query include time series information. Search results for the query can be obtained from a search engine (e.g., search engine 118). The resources referenced by the search results can be analyzed to determine whether they include time series information. For example, a web page can be parsed to determine whether it includes time series information, e.g., by processing tables or other structured data to identify numerical time series patterns, searching for date ranges, and using various other techniques. In some implementations, the search engine analyzes resources for time series information while it is indexing the resources for search purposes.

A cost estimate is generated that quantifies costs of including time series information with one or more search results (304), and a benefit estimate is generated that quantifies benefits of including time series information with the search results (306). Generating a cost estimate and a benefit estimate can be performed by a cost-benefit engine (e.g., cost-benefit engine 122). Generating a cost estimate and a benefit estimate is discussed further with respect to FIG. 4.

The benefit estimate is compared with the cost estimate (308). If the benefit estimate exceeds the cost estimate, time series information is generated (310). If the benefit estimate does not exceed the cost estimate, time series information is not generated (312). In some implementations, time series information is generated when the benefit estimate exceeds the cost estimate by a certain amount. In general, the generated time series information is provided to a client device (e.g., a client device that provided the query) or stored in a time series cache (e.g., time series cache 128). The time series cache 128 associates relevant time series information with corresponding queries so that the time series information can be quickly accessed when a query matching one of the corresponding queries in the cache 128 is received.

Generating time series information includes collecting responsive time series information from one or more resources. Collecting responsive time series information can be performed by a time series collection engine (e.g., time series collection engine 124). Collecting responsive time series information is discussed further with respect to FIG. 5.

At query time, a query is received from a client device. If the received query matches a query for which time series information was generated, e.g., the received query can be identical to the query, include one or more terms from the query or similar terms, or can refer to the same time series information (e.g., "Maine minimum wage in the 90s" and "Maine minimum wage from 1990-2000."), then instructions are provided to the client device that, when executed by the client device, cause the time series information to be displayed on the client device.

In some of those implementations, it is determined whether to provide the time series information to the client device in a graph format or in a table format. For example, the system determines to provide the time series information in a graph format when the number of data points in the time series information exceeds a threshold number of data points, and in table format when the number of data points in the timer series information does not exceed the threshold number. Alternatively, or in addition, user click data from click log data (e.g., click data 130) is used to determine whether to provide the time series information in a graph format or in a table format. For example, if the time series information has previously been provided in both a graph format and a table format, then the user click data can be analyzed to determine whether users clicked on one format more frequently, whether long clicks occurred for one format for longer periods of time than for another format, and so on. In these implementations, instructions are provided to the client device to display the time series information in the determined format.

In some implementations, instructions are provided to a client device that, when executed by the client device, cause a prompt to be displayed on the client device asking whether time series information is desired. For example, the prompt 206 in FIG. 2B can be displayed. A user can indicate that time series information is desired, e.g., by clicking on the prompt. If the user indicates that time series information is desired, an indication is received from the client device that time series information is desired.

Figure 4:
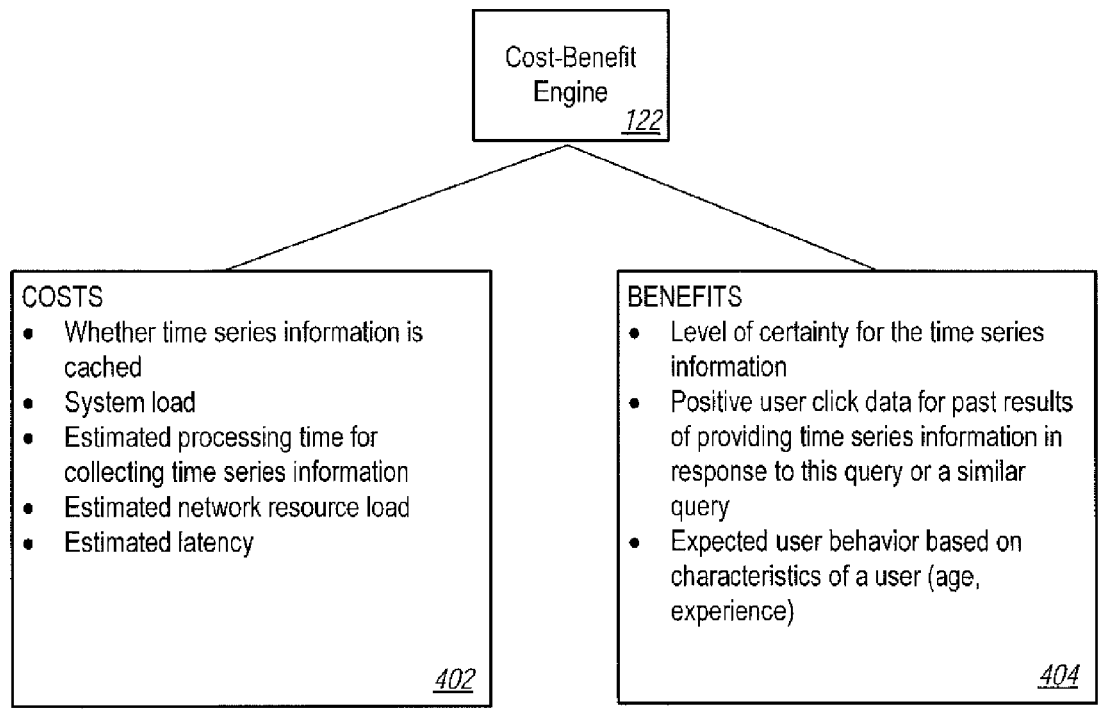
FIG. 4 is a block diagram showing a cost-benefit engine.

FIG. 4 is a block diagram showing a cost-benefit engine 122. The cost-benefit engine 122 generates a cost estimate that quantifies one or more costs of including time series information with one or more search results. The cost-benefit engine 122 also generates a benefit estimate that quantifies one or more benefits of including the time series information with the search results.

In some implementations, the cost-benefit engine 122 compares the cost estimate with the benefit estimate to determine whether the benefit is greater than the cost estimate (or exceeds the cost estimate by a minimum amount). In some implementations, the cost-benefit engine 122 generates the cost estimate and the benefit estimate prior to receiving a query from a user. For example, the cost-benefit engine 122 can be used for cost-benefit comparison for popular queries in a query log. Then, when a popular query is received from a user, a search system (e.g., search system 110) can look up the result of the cost-benefit comparison rather than determining the cost and benefit estimate for the user's query at query time. Alternatively, the cost-benefit engine 122 can generate the cost estimate and the benefit estimate in response to a specific query from a user at query time.

Generating the cost estimate can include determining information from various sources. Some of the possible information is illustrated in FIG. 4 as a list 402. The information can be used alone or in combination with other information to calculate the cost estimate.

In some implementations, generating the cost estimate includes determining whether time series information is cached (e.g., in time series cache 128) for a certain query. The cost estimate will be smaller where the time series information is cached than it will be where the time series information is not cached.

In some implementations, generating the cost estimate includes determining a system load (e.g., of search system 110). The system load is a measure of the amount of processing that a system performs or is performing (e.g., over one, five, or fifteen minute periods). The cost estimate will be smaller where the system load is smaller.

In some implementations, generating the cost estimate includes determining an estimated amount of processing time for collecting responsive time series information. For example, where collecting responsive time series information will require accessing higher numbers of resources, the processing time will be higher and consequently the cost estimate will be higher.

In some implementations, generating the cost estimate includes determining an estimated network resource load for providing time series information. For example, a search system (e.g., search system 110) can determine how much additional network traffic would be required to provide time series information for a query. Available network resources (e.g., resources that are not being used to their full extent or maximum bandwidth) can be considered. The cost estimate will be higher where the estimated network resource load is higher.

In some implementations, generating the cost estimate includes determining an estimated latency for collecting responsive time series information. The estimated latency can be based on the system load, the estimate amount of processing time, the network resource load, whether the user is communicating over a mobile network that has a high latency relative to a direct IP network connection, and so on. The cost estimate will be higher where the estimated latency is higher. For example, the cost for providing time series information to a mobile communication device may be higher than providing time series information to a personal computer with a cable connection to a direct Internet connection.

In some implementations, generating the cost estimate includes determining a storage device cost. The storage device cost can be based on, for example, additional Random Access Memory (RAM) used in generating the time series information, disk space on hard drive disk for storing time series information, and so on.

In some implementations, generating the cost estimate includes determining a cost of screen space on a user device. In general, providing time series information with search results involves moving other information, for example, moving other search results further down a page or onto another page, or displaying search results in a smaller font, or moving advertisements further down the page or from the top of a page to the side of a page.

Generating the benefit estimate can include determining information from various sources. Some of the possible information is illustrated in FIG. 4 as a list 404. The information can be used alone or in combination with other information to calculate the benefit estimate.

In some implementations, generating the benefit estimate includes determining expected user behavior based on one or more characteristics of a user that provided a query. The characteristics of the user can be provided by a system that tracks user behavior (e.g., by placing cookies on client devices, having users log on to get email and other personalized services, and so on). For example, users who have an estimated age below a certain threshold can be assumed to be less interested in time series information. In those cases, the benefit estimate is lower for those users. In another example, users who have previously searched for or clicked on time series information can be assumed to be more interested in time series information. In those cases, the benefit estimate is higher for those users.

In some implementations, generating the benefit estimate includes determining a level of certainty for the time series information. For example, in some cases the time series information is collected from multiple resources, and the resources conflict as to certain data points of the time series. There, if the difference between the conflicting data points is smaller, the benefit estimate will be higher. In another example, the trustworthiness of a resource is considered (e.g., whether the resource is provided from a popular government web site or a low traffic web site, or how recently a web site has been updated). If the trustworthiness of a resource is higher, the benefit estimate will be higher.

In some implementations, generating the benefit estimate includes analyzing click log data for search results in which time series information was provided with the search results. For example, the benefit estimate will be higher where the click log data indicates that many users have clicked on the time series information (e.g., to change its display or download the underlying data). In another example, the benefit estimate will be higher where the click log data indicates that users have lingered over the time series information for longer (e.g., there was more time between being presented with the time series information and clicking on a search result or navigating away from the page).

In some implementations, generating the benefit estimate includes determining or estimating the total number of points in the time series. For example, typically, a time series with more points is more useful. In some cases, a user will be able to see a time series with only a few points simply by inspecting snippets included with search results.

Figure 5:
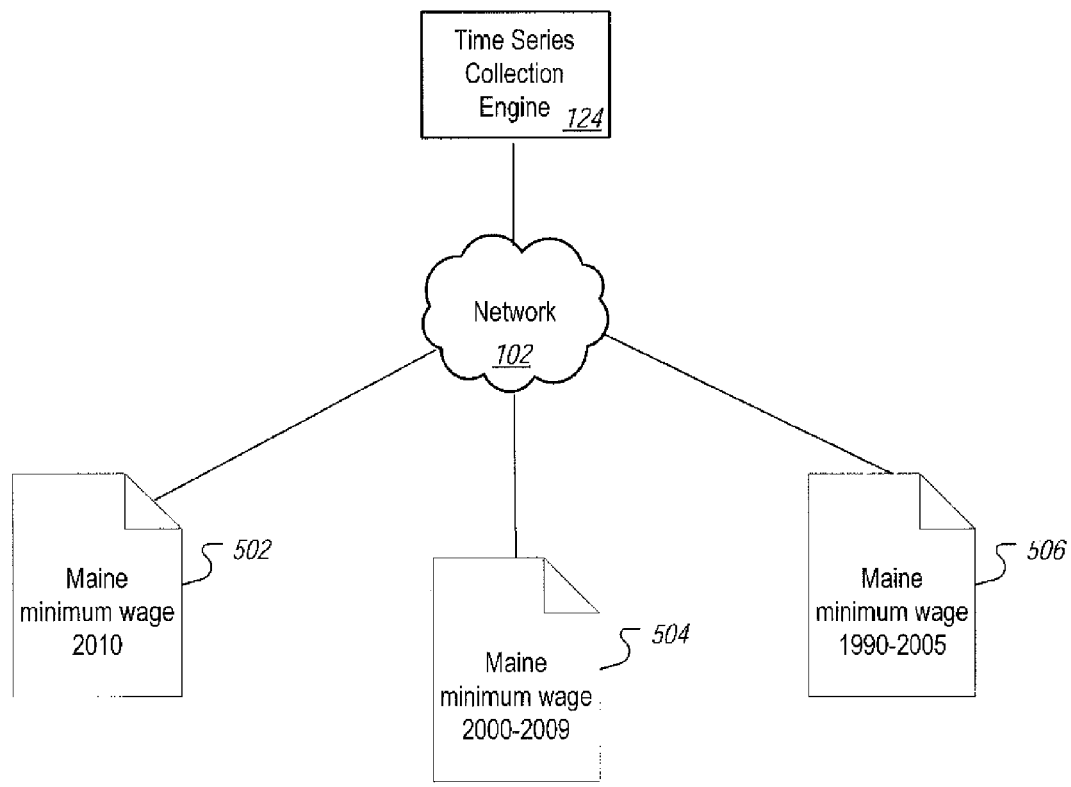
FIG. 5 is a block diagram illustrating a time series collection engine.

FIG. 5 is a block diagram illustrating a time series collection engine 124. The time series collection engine 124 collects time series information responsive to a query from one or more resources (e.g., resources 502, 504, and 506).

In some implementations, the time series collection engine 124 obtains resources over a network 102. For example, the time series collection engine can obtain search results for the query from a search engine (e.g., search engine 118) and obtain the resources referenced by the search results. In some implementations, the resources are indexed (e.g., in resource index 126) and the time series collection engine 124 obtains the resources from the index.

In some implementations, the time series collection engine 124 extracts time series information from resources referenced by search results for the query and aggregates the time series information. Extracting time series information from a resource includes, for example, parsing the text of the resource for time series information, examining the resource for a table of time series information, and so on.

For example, consider the query "Maine minimum wage," and suppose that search results for that query reference three resources 502, 504, and 506. For a first resource 502, the time series collection engine extracts the minimum wage for Maine in 2010. For a second resource 504, the time series collection engine extracts the minimum wage for Maine from 2000-2009. For a third resource 506, the time series collection engine extracts the minimum wage for Maine from 1990-2005. Using all of the extracted data, the data can be aggregated to create a time series for the minimum wage in Maine from 1990-2010. Moreover, the data from 2000-2005 from the second and third resources 504 and 506 can be compared. If the data differ, various actions can be taken, e.g., placing error bars on a graph of time series information, determining a level of certainty for a cost-benefit engine, and so on.

In another example for the query "Maine minimum wage," suppose that the following two blocks of text are identified in two separate resources:

"Starting Oct. 1, 2006, the minimum hourly wage is $6.75 per hour. Starting Oct. 1, 2007, the minimum hourly wage is $7.00 per hour."

and

"Minimum wage earners will receive a raise in their hourly pay on October 1, when the state minimum wage increases a quarter from $7 to $7.25 per hour."

The time series collection engine 124 can determine that, in the second statement, the reference to October 1 refers to October 2008 by determining that the second resource is a newspaper article dated Sep. 24, 2008. Furthermore, the time series collection engine 124 can determine that, based on the lack of news between October 2007 and October 2008, the minimum wage did not change over that period. This determination can also be based on the fact that the minimum wage was the same ($7) at the last known time from the first resource (October 2007) and the earliest known time from the second resource. Thus, the time series collection engine 124 can generate time series information for October 2006 through October 2008.

In some implementations, for a resource that is dated (e.g., news articles with a date, or web pages associated with a revision history date, or the like), time series information is extracted and aggregated by taking one or more data points from each version of the resource and associating those data points with the date for that version of the resource.

In some implementations, the time series collection engine 124 populates a time series cache (e.g., time series cache 128) with time series information. The time series collection engine 124 accesses a cache of indexed resources (e.g., resource index 126). For each indexed resource, the time series collection engine 124 determines whether the indexed resource includes any time series information. If the resource does include time series information, the time series collection engine 124 extracts the time series information, associates it with the indexed resource, and includes it in a time series cache.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   determining that a first query of one or more terms is indicative of a request for time series information;
   generating a cost estimate that quantifies one or more costs of including the time series information with one or more search results, each search result responsive to the query includes a resource locator that references a corresponding resource;
   generating a benefit estimate that quantifies one or more benefits of including the time series information with the one or more search results, including analyzing click log data for search results in which time series information was provided with the search results and calculating the benefit estimate based in part on the click log data;
   determining, by comparing the cost estimate with the benefit estimate, that the benefit estimate is greater than the cost estimate;
   in response to determining that the benefit estimate is greater than the cost estimate, generating the time series information, wherein generating the time series information includes collecting responsive time series information from one or more resources referenced by the one or more search results responsive to the query; and
   providing the generated time series information to a client device.

2. The method of claim 1, wherein collecting responsive time series information includes extracting time series information from the plurality of the resources referenced by the search results and aggregating the time series information.

3. The method of claim 1, further comprising:
  determining a level of certainty for one or more points of the time series information; and
  providing instructions to a client device that, when executed by the client device, cause the time series information to be displayed with an indication of the level of certainty for the one or more points.

4. The method of claim 1, wherein analyzing click log data for search results in which time series information was provided with the search results and calculating the benefit estimate based in part on the click log data comprises determining that the click log data indicates that at least a certain number of users have selected the time series information and, in response to the determination, increasing the benefit estimate.

5. The method of claim 1, wherein analyzing click log data for search results in which time series information was provided with the search results and calculating the benefit estimate based in part on the click log data comprises determining that the click log data indicates that at least a certain number of users have lingered over the time series information and, in response to the determination, increasing the benefit estimate.

6. The method of claim 5, wherein determining that the click log data indicates that at least a certain number of users have lingered over the time series information comprises comparing a first time that a first user was presented with the time series information with a second time that the first user clicked on a first search result or navigated away from the time series information.

7. A system comprising:
  one or more processors configured to interact with a computer storage medium in order to perform operations comprising:
    determining that a first query of one or more terms is indicative of a request for time series information;
    generating a cost estimate that quantifies one or more costs of including the time series information with one or more search results, each search result responsive to the query includes a resource locator that references a corresponding resource;
    generating a benefit estimate that quantifies one or more benefits of including the time series information with the one or more search results, including analyzing click log data for search results in which time series information was provided with the search results and calculating the benefit estimate based in part on the click log data;
    determining, by comparing the cost estimate with the benefit estimate, that the benefit estimate is greater than the cost estimate;
    in response to determining that the benefit estimate is greater than the cost estimate, generating the time series information, wherein generating the time series information includes collecting responsive time series information from one or more resources referenced by the one or more search results responsive to the query; and
    providing the generated time series information to a client device.

8. The system of claim 7, wherein collecting responsive time series information includes extracting time series information from the plurality of the resources referenced by the search results and aggregating the time series information.

9. The system of claim 7, the operations further comprising:
  determining a level of certainty for one or more points of the time series information; and
  providing instructions to a client device that, when executed by the client device, cause the time series information to be displayed with an indication of the level of certainty for the one or more points.

10. The system of claim 7, wherein analyzing click log data for search results in which time series information was provided with the search results and calculating the benefit estimate based in part on the click log data comprises determining that the click log data indicates that at least a certain number of users have selected the time series information and, in response to the determination, increasing the benefit estimate.

11. The system of claim 7, wherein analyzing click log data for search results in which time series information was provided with the search results and calculating the benefit estimate based in part on the click log data comprises determining that the click log data indicates that at least a certain number of users have lingered over the time series information and, in response to the determination, increasing the benefit estimate.

12. The system of claim 11, wherein determining that the click log data indicates that at least a certain number of users have lingered over the time series information comprises comparing a first time that a first user was presented with the time series information with a second time that the first user clicked on a first search result or navigated away from the time series information.

13. A computer storage device encoded with a computer program, the program comprising instructions that when executed by data processing apparatus cause the data processing apparatus to perform operations comprising:
  determining that a first query of one or more terms is indicative of a request for time series information;
  generating a cost estimate that quantifies one or more costs of including the time series information with one or more search results, each search result responsive to the query includes a resource locator that references a corresponding resource;
  generating a benefit estimate that quantifies one or more benefits of including the time series information with the one or more search results, including analyzing click log data for search results in which time series information was provided with the search results and calculating the benefit estimate based in part on the click log data;
  determining, by comparing the cost estimate with the benefit estimate, that the benefit estimate is greater than the cost estimate;
  in response to determining that the benefit estimate is greater than the cost estimate, generating the time series information, wherein generating the time series information includes collecting responsive time series information from one or more resources referenced by the one or more search results responsive to the query; and
  providing the generated time series information to a client device.

14. The computer storage device of claim 13, wherein collecting responsive time series information includes extracting time series information from the plurality of the resources referenced by the search results and aggregating the time series information.

15. The computer storage device of claim 13, the operations further comprising:

determining a level of certainty for one or more points of the time series information; and providing instructions to a client device that, when executed by the client device, cause the time series information to be displayed with an indication of the level of certainty for the one or more points.

16. The computer storage device of claim 13, wherein analyzing click log data for search results in which time series information was provided with the search results and calculating the benefit estimate based in part on the click log data comprises determining that the click log data indicates that at least a certain number of users have selected the time series information and, in response to the determination, increasing the benefit estimate.

17. The computer storage device of claim 13, wherein analyzing click log data for search results in which time series information was provided with the search results and calculating the benefit estimate based in part on the click log data comprises determining that the click log data indicates that at least a certain number of users have lingered over the time series information and, in response to the determination, increasing the benefit estimate.

18. The computer storage device of claim 17, wherein determining that the click log data indicates that at least a certain number of users have lingered over the time series information comprises comparing a first time that a first user was presented with the time series information with a second time that the first user clicked on a first search result or navigated away from the time series information.

* * * * *